(12) United States Patent
Sawai et al.

(10) Patent No.: US 6,581,287 B2
(45) Date of Patent: Jun. 24, 2003

(54) METHOD FOR ASSEMBLING A HUB UNIT FOR SUPPORTING A WHEEL SHAFT

(75) Inventors: Hiroyuki Sawai; Takafumi Kuwano; Yoshifumi Hirano, all of Tokyo (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/947,435

(22) Filed: Sep. 7, 2001

(65) Prior Publication Data

US 2002/0006240 A1 Jan. 17, 2002

Related U.S. Application Data

(63) Continuation of application No. 09/591,509, filed on Jun. 12, 2000, now Pat. No. 6,336,747, which is a continuation of application No. 09/050,252, filed on Mar. 30, 1998, now Pat. No. 6,113,279.

(30) Foreign Application Priority Data

Mar. 31, 1997 (JP) .............................................. 9-79898

(51) Int. Cl.[7] .............................................. B21D 53/10
(52) U.S. Cl. ........................... 29/898.062; 29/894.361; 29/894.362; 29/512; 29/898.07
(58) Field of Search ..................... 29/898.061, 898.062, 29/898.07, 898.09, 894.36, 894.361, 894.362, 522.1, 524.1, 509, 512; 384/544, 537, 543, 585, 589; 301/105.1

(56) References Cited

U.S. PATENT DOCUMENTS

| 4,893,960 A | | 1/1990 | Beier et al. |
|---|---|---|---|
| 5,226,738 A | * | 7/1993 | Valette et al. |
| 5,490,732 A | | 2/1996 | Hofmann et al. ........... 384/537 |
| 5,603,554 A | | 2/1997 | Monroe et al. .......... 301/105.1 |
| 5,822,859 A | * | 10/1998 | Kessen et al. |
| 5,927,820 A | * | 7/1999 | Vignotto et al. |
| 6,113,279 A | * | 9/2000 | Sawai et al. |
| 6,280,096 B1 | * | 8/2001 | Miyazaki et al. |
| 2002/0018698 A1 | * | 2/2002 | Miyazaki et al. |

FOREIGN PATENT DOCUMENTS

| EP | 0 736 398 | | 10/1996 | ........... B60B/27/00 |
|---|---|---|---|---|
| GB | 2233404 | * | 1/1991 | |

* cited by examiner

*Primary Examiner*—S. Thomas Hughes
*Assistant Examiner*—Eric Compton
(74) *Attorney, Agent, or Firm*—Sughrue Mion, PLLC

(57) ABSTRACT

A caulked portion is formed by plastic deformation of a cylindrical portion which is formed at the inner end of a shaft member and is reduced in thickness toward the leading end in a diametrical outward direction. The force required to form the caulked portion is reduced, and the caulked portion is less susceptible to damage. Further, the force of the caulked portion for supporting the inner ring is ensured.

1 Claim, 5 Drawing Sheets

TILT ANGLE OF INNER PERIPHERAL SURFACE OF CYLINDRICAL
PORTION RELATIVE TO CENTER AXIS OF CYLINDRICAL PORTION

US 6,581,287 B2

METHOD FOR ASSEMBLING A HUB UNIT FOR SUPPORTING A WHEEL SHAFT

CROSS REFERENCE TO RELATED APPLICATIONS

This is a continuation of application Ser. No. 09/591,509 filed Jun. 12, 2000 (issued as U.S. Pat. No. 6,336,747 on Jan. 8, 2002) which is a continuation of application Ser. No. 09/050,252 filed Mar. 30, 1998 (issued as U.S. Pat. No. 6,113,279 on Sep. 5, 2000), the disclosures of which are incorporated herein by reference.

BACKGROUND OF THE INVENTION

The present invention relates to a hub unit for supporting a wheel shaft, which is utilized for supporting a wheel of a vehicle rotatively relative to a suspension system.

Wheels of a vehicle are supported on the suspension system by means of hub units for supporting wheels. FIG. 8 shows one example of a hub unit for supporting a wheel described in U.S. Pat. No. 5,490,732. A hub unit 1 for supporting a wheel comprises a shaft member 2, a pair of inner rings 3a, 3b, an outer ring 4, and a plurality of rolling elements 5, 5. A flange (a first flange) 6 for supporting a wheel is formed along the outer peripheral surface of outer-edge portion of the shaft member 2 (here the expression "out or outside" designates a direction toward the outside of the vehicle in a widthwise direction when the hub unit is mounted on the vehicle, that is, a leftward direction in FIG. 8, and in contrast, an expression "in or inside" designates a direction toward the center of the vehicle in the widthwise direction, that is, a rightward direction in FIG. 8.). A stepped portion 7 is formed along the base of the flange 6 in the vicinity of the axial center of the axial member 2.

The pair of inner rings 3a, 3b are provided and fitted around the outer surface of the axial member 2 which ranges from the middle portion to the inner end of the axial member. The outer side surface of the inner ring 3a abuts a vertical surface of the stepped portion 7, and the outer side surface of the inner ring 3b abuts the inner side surface of the inner ring 3a. A cylindrical portion 8 is formed in the inner end surface of the shaft member 2. A caulked portion 9 is formed by bending, in a diametrical outward direction, the edge of the cylindrical portion 8 which protrudes toward the inside beyond the inner end surface of the inner ring 3b. The pair of inner rings 3a, 3b are sandwiched between the vertical surface of the stepped portion 7 and the caulked portion 9.

The plurality of rolling elements 5, 5 are provided between a pair of outer (first and second) raceways 10, 10 formed along the inner peripheral surface of the outer ring 4 and a pair of inner (first and second) raceways 11, 11 formed respectively along the outer peripheral surfaces of the inner rings 3a, 3b. Although balls are used as the rolling elements 5, 5 in an illustrated example, tapered rollers may also be used as the rolling elements for a heavy hub unit for supporting a vehicle wheel. Alternatively, the (first) inner raceway formed adjacent to the flange 6 may be directly formed along the outer peripheral surface of the shaft member 2, and the outer inner ring 3a may be omitted in some cases. In such a case, the stepped portion 7 is formed in an inner position relative to the inner ring 3a shown in FIG. 8.

The foregoing hub unit 1 is locked to the vehicle by securing the outer wheel 4 to the suspension system through use of an outwardly extending flanged mount (a second flange) 12 formed along the outer peripheral surface of the outer wheel 4, and by fastening the wheel to the flange 6. As a result, the wheel can be rotatively secured to the suspension system.

In the case of the conventional construction shown in FIG. 8, the caulked portion 9 is susceptible to damage such as cracks when being formed in order to fixedly fit the inner rings 3a, 3b on the shaft member 2. Further, at the time of formation of the caulked portion 9, force is exerted, in a diametrical outward direction, on the inner peripheral surface of the inner ring 3b adjoining the caulked portion 9. In short, in the case of the conventional construction, for the purpose of forming the caulked portion 9, the cylindrical portion 8 is formed in the inner end face of the shaft member 2 in such a way that the inner and outer peripheral surfaces of the cylindrical portion 8 become concentric with each other in axial direction of the shaft member. Since the outer and inner peripheral surfaces of the shaft member are formed into mere cylindrical surfaces which are concentric with each other, the cylindrical portion 8 is formed with uniform thickness over its entire length. Such a construction requires great force to produce the caulked portion 9 by caulking the protruding edge of the cylindrical portion 8, rendering the caulking operation laborious. Further, the caulking operation entails exertion of great tensile force on the leading edge of the caulked portion 9, rendering the caulked portion susceptible to damage.

Since great force is exerted on the leading edge of the caulked portion when the caulked portion is formed by caulking, the force exerted on the internal peripheral surface of the inner ring 3b from the caulked portion is also increased correspondingly. Although not to a greater extent, the diameter of the inner ring 3b is slightly changed. If there is an increase in the amount of change in the diameter of the inner ring, there arises a risk of the inner ring 3b being subjected to damage such as cracks, and a risk of a change in the diameter of the inner raceways 11, 11 formed along the outer peripheral surface of the inner ring 3b or of deterioration of geometrical accuracy (e.g., roundness or the degree of accuracy of a cross-sectional profile) of the inner ring. This in turn makes it laborious to maintain at an optimum value the preload imparted to the rolling elements 5, 5 interposed between the inner raceways 11, 11 formed along the outer peripheral surface of the inner ring 3b and the outer raceways 10, 10 facing the inner raceways 11, 11, posing the risk of difficulty of ensuring the durability of the hub unit 1.

SUMMARY OF THE INVENTION

The hub unit according to the present invention has been conceived in view of the foregoing problems, and an object of the present invention is to prevent a caulked portion from being subjected to damage such as cracks when an inner ring is fixed, as well as to prevent a change in the inner diameter of the inner ring or the diameter of inner raceways formed along the outer periphery of the inner ring, which would otherwise caused by a caulking operation to such an extent as to pose practical problem.

Similar to the conventional hub unit mentioned previously, a hub unit for supporting a wheel of a vehicle according to the present invention also includes: a shaft member having a first flange which is formed at one end of the shaft member on the outer peripheral surface of the same; a first inner raceway which is formed directly on the outer peripheral surface of the intermediate portion of the shaft member or indirectly on the same by way of an inner raceway separated from the shaft member; a stepped portion which is formed in the vicinity of the other end of the shaft member and which has an outer diameter smaller than that of the area of the shaft member where the first inner raceway is formed; an inner ring which has a second inner raceway formed on the outer peripheral surface thereof and which is fitted around the stepped portion; an outer ring which has a first outer raceway formed on the internal peripheral surface thereof so as to face the first inner raceway, a second outer raceway formed on the same so as to face the second inner raceway, and a second flange formed on the outer peripheral surface thereof; and a plurality of rolling elements which are interposed between the first inner raceway and the first outer raceway and between the second inner raceway and the second outer raceway. The hub unit of the present invention further comprises a caulked portion formed by caulking and spreading in a diametrical outward direction a portion of a cylindrical portion which is formed on the other end of the shaft member and which extends beyond at least the inner ring fitted around the stepped portion. The caulked portion presses the inner ring fitted around the stepped portion toward the end face of stepped portion, thereby fixedly fastening the inner ring fitted around the stepped portion to the shaft member. Particularly, the hub unit according to the present invention is characterized by the feature that the cylindrical portion has a smaller thickness toward the leading end of the cylindrical portion before it is caulked and spread in the diametrical outward direction, and the thickness of the caulked portion, which is formed by caulking and spreading in the diametrical outward direction the cylindrical portion and which presses the end face of the inner ring fitted around the stepped portion, is gradually reduced toward the leading end of the caulked portion in comparison with the thickness of the base of the cylindrical portion.

More preferably, the hub unit according to the present invention has one or both of the following requirements ① and ②.

① The opening formed on the other end of the ring has a chamfer which has a circular-arc cross section and which connects the inner end flat surface of the inner ring to the inner peripheral and cylindrical surface of the inner ring.

The outer peripheral edge of the caulked portion is placed at an inner position in a diametrically inward direction relative to the point of intersection between the outer peripheral edge of the chamfer and the inner peripheral edge of the inner end surface of the inner ring.

② A first axial position is set at a point which is spaced away from the inner end surface of the inner ring toward the center axis of the shaft member by a distance which is 1.26 times the width to be caulked equal to half of the difference between the outer diameter of the caulked portion and the inner diameter of the inner ring. Further, the inner most end of the inner peripheral surface used for forming the caulked portion is taken as a second axial position. A third axial position is set at a point on the side surface close to the inner end surface of the inner ring among the surfaces of the inner raceway formed along the outer peripheral surface of the inner ring. In a state in which the caulked portion is formed, the second axial position is placed at a position, in the axial direction of the shaft member, between the first axial position and the third axial position.

The operation of the hub unit for supporting a vehicle wheel having the foregoing structure according to the present invention is the same as that of the conventional hub unit; that is, the hub unit rotatively supports a wheel with respect to a suspension system.

Particularly, in the case of the hub unit according to the present invention, since the thickness of the cylindrical portion used for forming the caulked portion is gradually reduced toward the leading edge, excessively great force is not required to form the caulked portion. Accordingly, the caulked portion is protected from damage such as cracks, which would otherwise be caused when the caulked portion is machined. Further, it is possible to prevent force, which would otherwise change the diameter of the inner ring fitted to the shaft member by the caulked portion such an extent as to affect the preload exerted on the inner ring or the durability of the inner ring such as the rolling fatigue life of the inner ring.

In a case where the hub unit satisfies the requirement ①, the outer peripheral edge of the caulked portion can be effectively protected from imperfections such as cracks, burrs, or underfill.

Further, in a case where the hub unit satisfies the requirement ②, no clearance arises between the outer peripheral surface of the caulked portion and the inner peripheral surface of the inner ring, and the supporting strength of the inner ring imparted by the caulked portion is ensured. Further, the deformation of the inner raceway is also prevented.

DETAILED DESCRIPTION OF THE PREFERRED EMBODIMENTS

FIGS. 1 through 7 show one example in which the present invention is carried out. The features of the present invention lie in a structure for securing an inner ring 3 relative to a shaft member 2. In contrast with the conventional structure shown in FIG. 8, the structure according to the present embodiment comprises one inner ring 3 and a pair of inner raceways 11, 11 an outer one of which is directly formed along the outer peripheral surface of the shaft member 2. Accordingly, the stepped portion 7 is formed along an inner end portion of the shaft member 2. Since the hub unit according to the embodiment is the same in structure and operation as the conventional hub unit shown in FIG. 8, and hence overlapping explanations thereof will be omitted or simplified. An explanation will be primarily given of the characteristic portion of the present invention.

Figure 6:
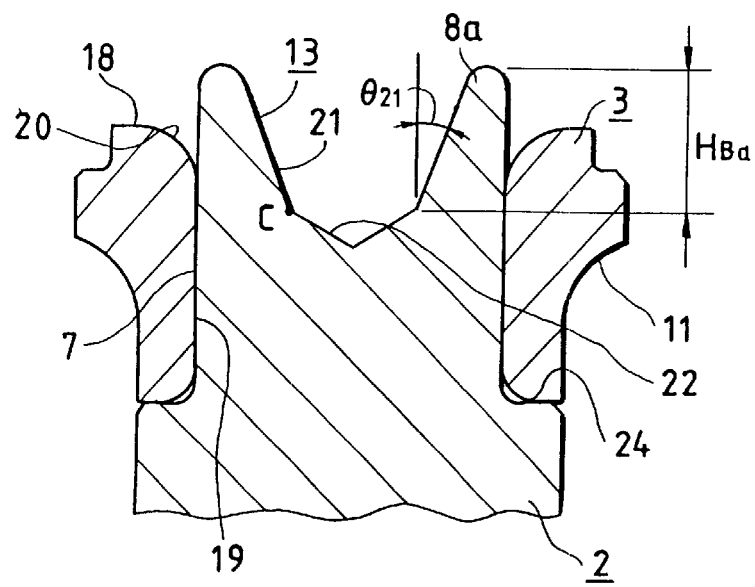
FIG. 6 is a fragmentary cross-sectional view showing the inner end of the shift member before being caulked and extended.

FIG. 6 shows the wall thickness of a cylindrical portion 8a which is formed in the inner end of the shaft member 2 in order to constitute a caulked portion 9a used for fixing the inner ring 3. Before being caulked in a diametrical outward direction, the cylindrical portion 8a is tapered so as to have a smaller thickness toward the leading end. To this end, in the case of the illustrated shaft member, a tapered hole 13 is formed in the inner end surface of the shaft member 2 so as to have a smaller inner diameter toward the inner most end of the hole.

Figure 7:
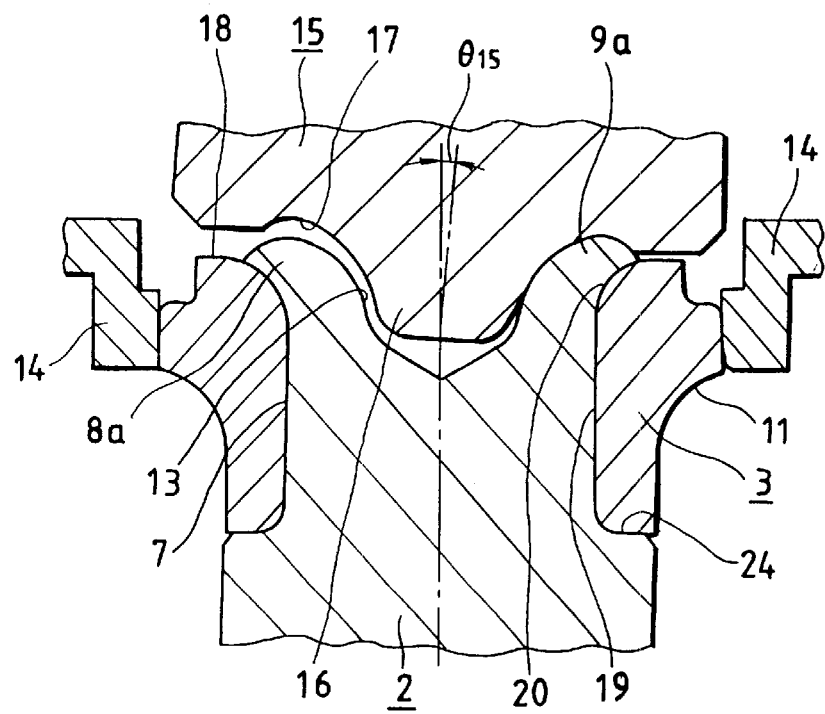
FIG. 7 is a fragmentary cross-sectional view showing formation of the caulked portion.
Figure 8:
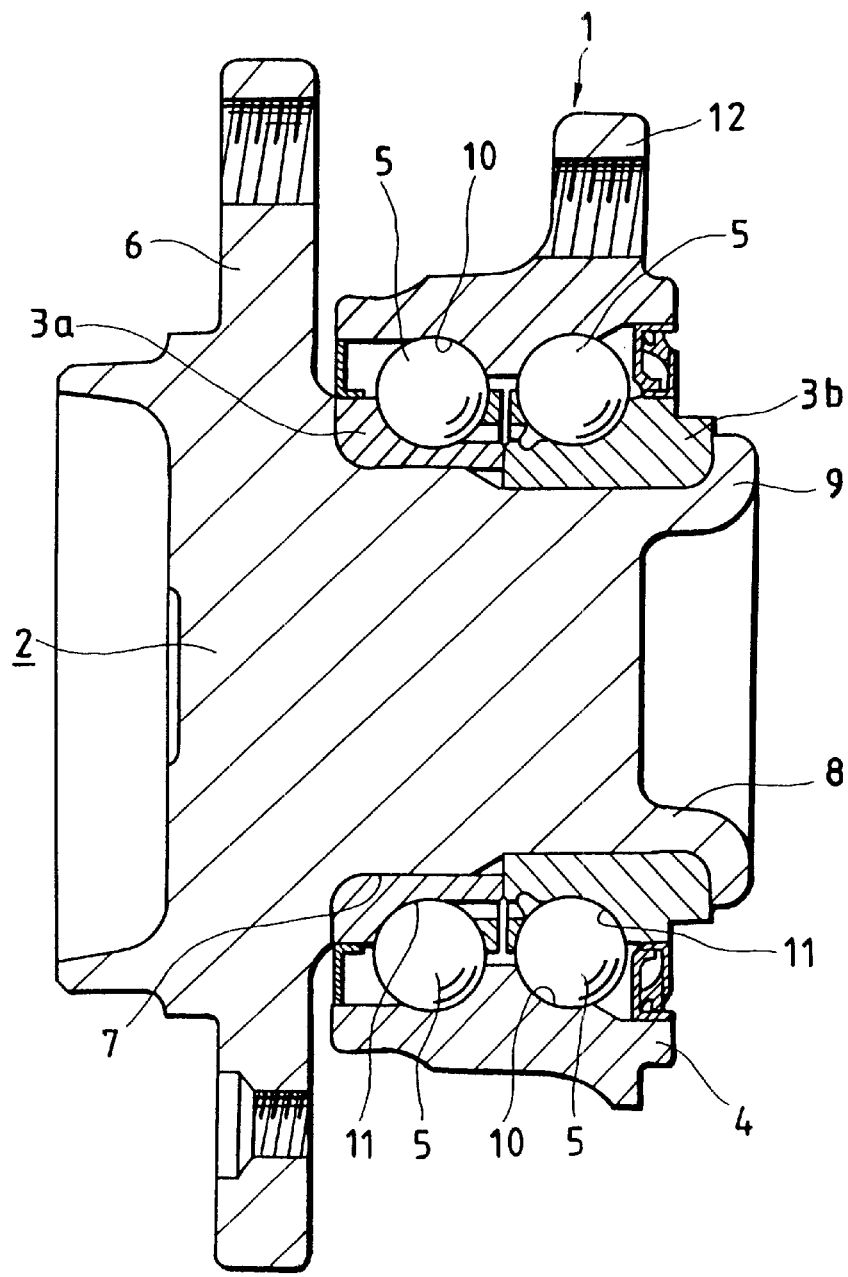
FIG. 8 is a cross-sectional view showing one example of structure of a conventional hub unit.

To caulk the leading edge of the cylindrical portion 8a having such a structure in order to fix the inner ring 3 around the outer periphery of the inner end portion of the shaft member 2, the shaft member 2 is fastened so as not to axially move off. In addition, as shown in FIG. 7, while the outer peripheral surface of the inner ring 3 is fixedly held by a pressure piece 14 so as to prevent the shaft member 2 having the inner ring 3 fitted thereon from developing deflections in the direction of the diameter of the shaft member, a press mold 15 is forcibly pressed against the leading end of the cylindrical portion 8a in a manner as shown in the drawing. A truncated conical protuberance 16 which is removably inserted into the inside of the cylindrical portion 18a is formed at the center of the end face (or the lowermost end face shown in FIG. 7) of the press mold 15. A recess 17 having a circular-arc cross section is formed so as to surround the truncated conical protuberance 16.

The shape and size of the cylindrical portion 8a, and the cross-sectional profile, outer diameter, and depth of the recess 17 are determined in such a way that the caulked portion 9a having the following predetermined shape and size is formed by plastic deformation of the cylindrical portion 8a while force is imparted to metal (or steel) constituting the cylindrical portion 8a in a direction in which the metal is compressed. An inner end face 18 in the form of a plane surface at right angles to the center axis of the inner ring 3, is formed around an inner-side opening of the inner ring 3 which is used for fixing the inner ring to the inner end portion of the shaft member 2 (i.e., the right end portion of the shaft member shown in FIG. 1 and the upper end portion shown in each of FIGS. 2, 4, 5, 6, and 7) by the caulked portion 9a. The inner peripheral edge of the inner end surface 18 is continually connected to an inner peripheral and cylindrical surface 19 of the inner ring 3 by way of a chamfer 20 having a circular-arc cross section.

Figure 4:
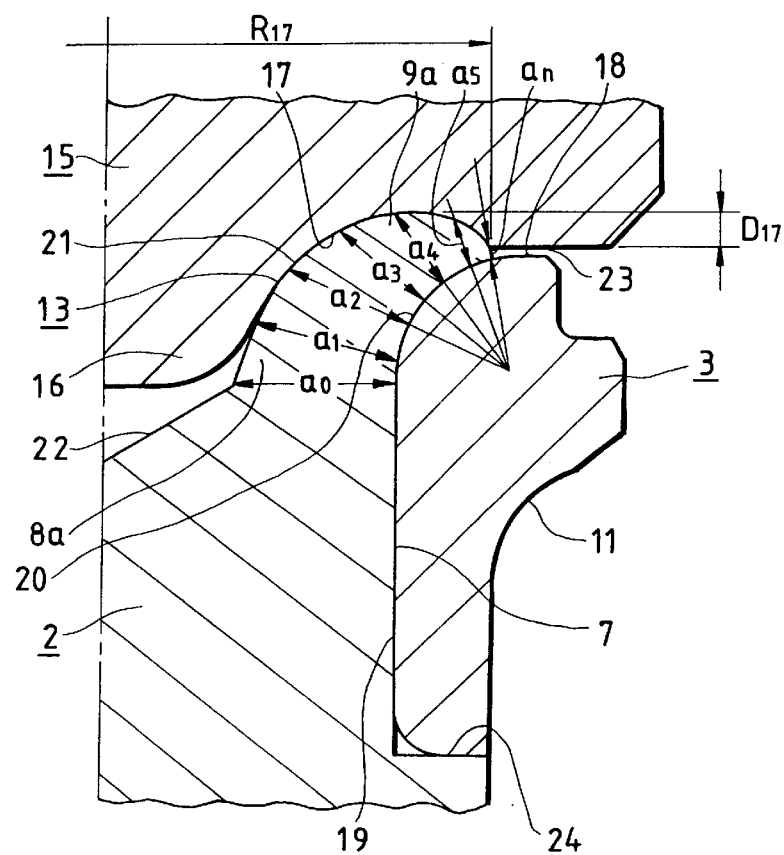
FIG. 4 is a fragmentary cross-sectional view for explaining the thickness of the caulked portion.
Figure 5:
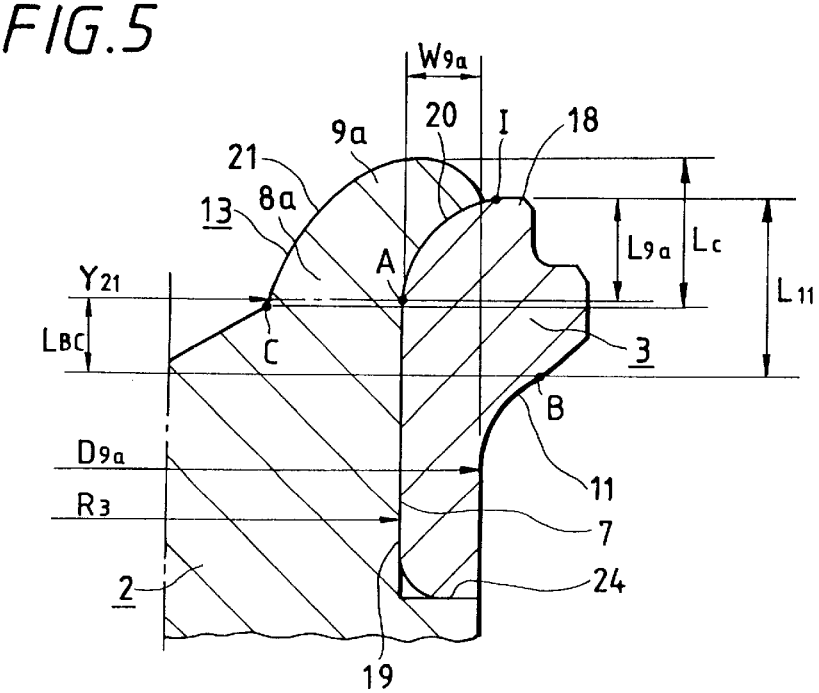
FIG. 5 is a fragmentary cross-sectional view for explaining the positional relationship between the caulked portion and the inner ring.

The caulked portion 9a used for fixing the inner ring 3, whose inner end is formed into the foregoing shape, to the stepped portion 7 of the shaft member 2, is formed by caulking and extending the caulked portion 9a in a diametrical outward direction. The thickness of the cylindrical portion is gradually reduced toward the leading end in comparison with the thickness $a_0$ (shown in FIG. 2) of the base of the caulked portion. More specifically, as shown in FIG. 4, taking the thickness of the base of the caulked portion 9a as $a_0$, the thickness of the caulked portion 9a changes in the order of $a_0, a_0, a_0, \ldots a_n$ toward the leading end of the caulked portion. The cross-sectional profile of each of the protuberance 16 and the recess 17 is determined in such a way that the caulked portion 9a is formed so as to maintain the relationship of wall thickness represented by $a_0 > a_1 > a_2 > \ldots > a_n$ and that the thickness $a_n$ of the leading end of the caulked portion 9a does not become zero ($a_n > 0$).

The reason why the tapered hole 13 for forming the cylindrical portion 8a is formed in the inner end face of the shaft member 2 in such a way that the inner diameter of the tapered hole becomes gradually smaller toward the innermost end of the hole, is for forming the caulked portion 9a mentioned previously. In short, given that the volume $V_{9a}$ of the caulked portion 9a is formed so as to have a constant value by caulking and extending the cylindrical portion 8a in the diametrically outward direction, the relationship between the height $H_{9a}$ of the cylindrical portion 8a (see FIG. 6) and the angle $\theta_{21}$ (FIG. 6) relative to the center axis of the cylindrical portion 8a is expressed by a curved line α shown in FIG. 3. The height $H_{9a}$ of the cylindrical portion 8a ensures formation of the caulked portion 9a and designates an axial dimension of the tapered hole 13 with the exception of a conical portion 22 formed at the innermost end of the tapered hole 13.

The volume $V_{9a}$ of the caulked portion 9a strongly affects the strength of the caulked portion used for fixing the inner ring 3 on the shaft member 2. More specifically, the greater the volume $V_{9a}$ is increased, the greater the fixing strength of the caulked portion is increased. On the other hand, the caulked portion 9a becomes difficult to form, and the weight of a hub unit for supporting a wheel is also increased.

For these reasons, it is necessary to maintain the volume $V_{9a}$ of the caulked portion 9a to such an extent as to be able to ensure required strength to prevent a defect in the caulked portion 9a. Turning again back to the curved line α from the foregoing viewpoint, as the height $H_{9a}$ and the angle $\theta_{21}$ become smaller; that is, the cylindrical portion 8a becomes shorter in the axial direction and the inner peripheral surface 21 becomes close to a cylindrical surface (i.e., within the range of curved line indicated by 1' in FIG. 3), the outer peripheral edge of the caulked portion 9a departs from the surface of the inner 3, ring thereby causing a so-called underfilled portion. The underfilled portion is not desirable, because the underfilled portion causes a reduction in the strength of the caulked portion 9a used for fixing the inner ring 3.

In contrast, as the height $H_{9a}$ and the angle $\theta_{21}$ become larger (i.e., within the range of curved line indicated by 2' in FIG. 3); that is, as the cylindrical portion 8a becomes longer in the axial direction and the inner peripheral surface 21 or the cylindrical portion 8a is changed from a cylindrical surface to a conical surface, thin burrs which are not useful for fitting the inner ring 3 on the stepped portion 7 arise in the outer peripheral edge of the caulked portion 9a or there readily occur cracks which cause a reduction in the strength of the area of the caulked portion that presses the inner ring 3 against the stepped portion 7. Accordingly, in order to ensure strength sufficient to fix the inner ring 3 on the shaft member 2 with a given volume $V_{9a}$, it is desirable to maintain the height $H_{9a}$ and the angle $\theta_{21}$ within a given range between lines 3' and 4' shown in FIG. 3. According to the research performed by the inventors, it is conceivable that so long as the angle $\theta_{21}$ is set to about 20 degrees, strength most sufficient to fix the inner ring 3 on the shaft member 2 can be secured with a given volume $V_{9a}$.

The overall outer peripheral edge of the caulked portion 9a is set at an inner position in the diametrical direction relative to the inner peripheral edge of the inner end surface 18. In other words, as show in FIG. 2, the overall outer peripheral edge of the caulked portion 9a is placed at an inner position in the diametrical direction relative to a point of junction I between the outer peripheral edge of the chamfer 20 and the inner peripheral edge of the inner end surface 18. The reason why the overall Outer peripheral edge of the portion 9a is placed in an inner position in the diametrical direction relative to the point of junction I, is also for preventing burrs or cracks from arising in the outer peripheral edge of the caulked portion 9a.

The position of the innermost end of the inner peripheral surface 21 of the cylindrical portion 8a used for forming the caulked portion 9a is defined by the relationship between the width $W_{9a}$ of the caulked portion 9a (see FIG. 5) and the inner end of the inner raceway 11 (i.e., the second inner raceway) formed along the outer peripheral surface of the inner ring 3. In this connection, an explanation will be given by reference to FIG. 5. First, a first axial position A is set at a point which is spaced away from the inner end surface 18 of the inner ring toward the center in the axial direction of the shaft member by a distance which is 1.26 times (1.26 $W_{9a} = L_{9a}$) the width $W_{9a}$ {=$(D_{9a}-R_3)/2$} equal to half of the difference between the outer diameter $D_{9a}$ of the caulked portion 9a and the inner diameter $R_3$ of the inner ring 3. Further, the inner most end of the inner peripheral surface 21 is taken as a second axial position C. A third axial position B is set at a point on the side surface close to the inner end surface 18 of the inner ring 3 among the surfaces of the inner raceway 11 formed along the outer peripheral surface of the inner ring 3. In such a case, in a state in which the caulked portion 9a is formed, the height $H_{9a}$ of the cylindrical portion 8a is determined in such a way that the second axial position C comes to a position in the vicinity of the first axial position A in the axial direction of the shaft member 2 within the range from the first axial position A to the third axial position B.

The reason why the second axial position C is determined in consideration of the relationship between the first and third axial positions A and B, is also for causing the caulked portion 9a to exert the effect of fixing the inner ring 3 to the maximum, and for preventing the inner raceway 11 to be deformed. If the second axial position C is set at a position closer to the leading edge of the cylindrical portion 8a relative to the first axial position A, a gap is apt to arise between a part of the outer peripheral surface of the caulked portion 9a formed by caulking the cylindrical portion 8a and the chamfer 20 formed along the inner opening of the inner ring 3. If such a gap arises, the strength of the caulked portion 9a used for fixing the inner ring 3 is reduced. In contrast, if the second axial position C is set at a position closer to the inner raceway 11 relative to the third axial position B. force is exerted, in a diametrical outward direction, on the area of the inner raceway 11 where the inner ring 3 is formed when the caulked portion 9a is formed, thereby rendering the inner raceway 11 susceptible to a dimensional change. For these reasons, it is desirable to determine the second axial position C in consideration of the relationship between the first and third axial positions A and B.

In order to form the caulked portion 9a having a geometry such as that mentioned previously by plastic deformation of the cylindrical portion 8a of such dimension and shape as those mentioned previously, the tilt angle $\theta_{21}$ of the inner peripheral surface 21 of the cylindrical portion 8a is preferably set to about 20 degrees. The recess 17 of the press mold 15 is formed so as to have a combined curved surface whose curvature radius becomes smaller in the direction of outer diameter. With this combined curved surface, when the caulked portion 9a is formed by plastic deformation of the leading end of the cylindrical portion 8a, the cross section of the caulked portion 9a becomes gradually smaller in thickness from the base to the leading edge of the caulked portion. Particularly, the caulked portion 9a becomes abruptly smaller in thickness at the leading edge of the caulked portion. The outer diameter $R_{17}$ of the recess 17 (see FIGS. 2 and 4) is set so as to become equal to or slightly smaller than the outside diameter $R_{9a}$ of the caulked portion 9a of the caulked portion 9a to be formed (i.e., $R_{17} \leq D_{9a}$). The depth $D_{17}$ of the recess 17 (see FIGS. 2 and 4) is determined in such a way as to ensure a clearance 23 between the leading end surface of the press mold 15 and the inner end surface 18 of the inner ring 3 while the caulked portion 9a is formed and while the leading end of the cylindrical portion 8a is held along the inner portion of the inner peripheral surface of the inner ring 3 and along the inner end surface 18 of the same.

So long as the press mold 15 having the protuberance 16 and the recess 17 which have the shapes and dimensions such as those mentioned previously is pressed against the leading end of the cylindrical portion 8a, the leading end of the cylindrical portion 8a is caulked and extended in a diametrical outward direction, enabling formation of the caulked portion 9a. The inner ring 3 is sandwiched between the thus-formed caulked portion 9a and a vertical surface 24 of the stepped portion 7 formed in the vicinity of the inner end portion of the shaft member 2, thereby enabling the inner ring 3 to be fixedly fitted to the shaft member 2. In the case of an illustrated embodiment, compressive force is exerted in a diametrical inward direction on the outer peripheral surface of the caulked portion 9a from the inner surface of the recess 17 in the final stage where the caulked portion 9a is formed by plastic deformation of the inner end surface of the cylindrical portion 8a. Accordingly, damage such as cracks can be effectively prevented from arising in the outer peripheral edge of the caulked portion 9a. Further, the chamfer 20 having a circular-arc cross section is formed along the periphery of the inner opening of the inner ring 3 with which the outer peripheral surface of the base of the caulked portion 9a comes into contact. Accordingly, the curvature radius of the base of the caulked portion 9a is prevented from being reduced, and hence the base of the caulked portion is prevented from being subjected to excessive stress.

As mentioned previously, in the hub unit for supporting a wheel according to the present invention, the cylindrical portion 8a used for forming the caulked portion 9a is formed so as to become smaller in thickness toward the leading end of the cylindrical portion. By virtue of such a configuration, it is not required to apply excessively strong force to form the caulked portion 9a by plastic deformation of the leading end of the cylindrical portion 8a through use of the press mold 15 having the foregoing structure. Accordingly, the caulked portion 9a is prevented from being subjected to damage such as cracks when being formed, or the inner ring 3 to be fixed by the caulked portion 9a is prevented from being subjected to force which would otherwise change the diameter of the inner ring 3 to such an extent as to affect the preload exerted on the inner ring or the durability of the inner ring such as rolling-fatigue life. Particularly, in the case of the illustrated embodiment, compressive stress is exerted on the leading end of the caulked portion 9a, and the curvature radius of the base of the caulked portion 9a is increased. Therefore, the caulked portion 9a is effectively protected from damage.

Figure 1:
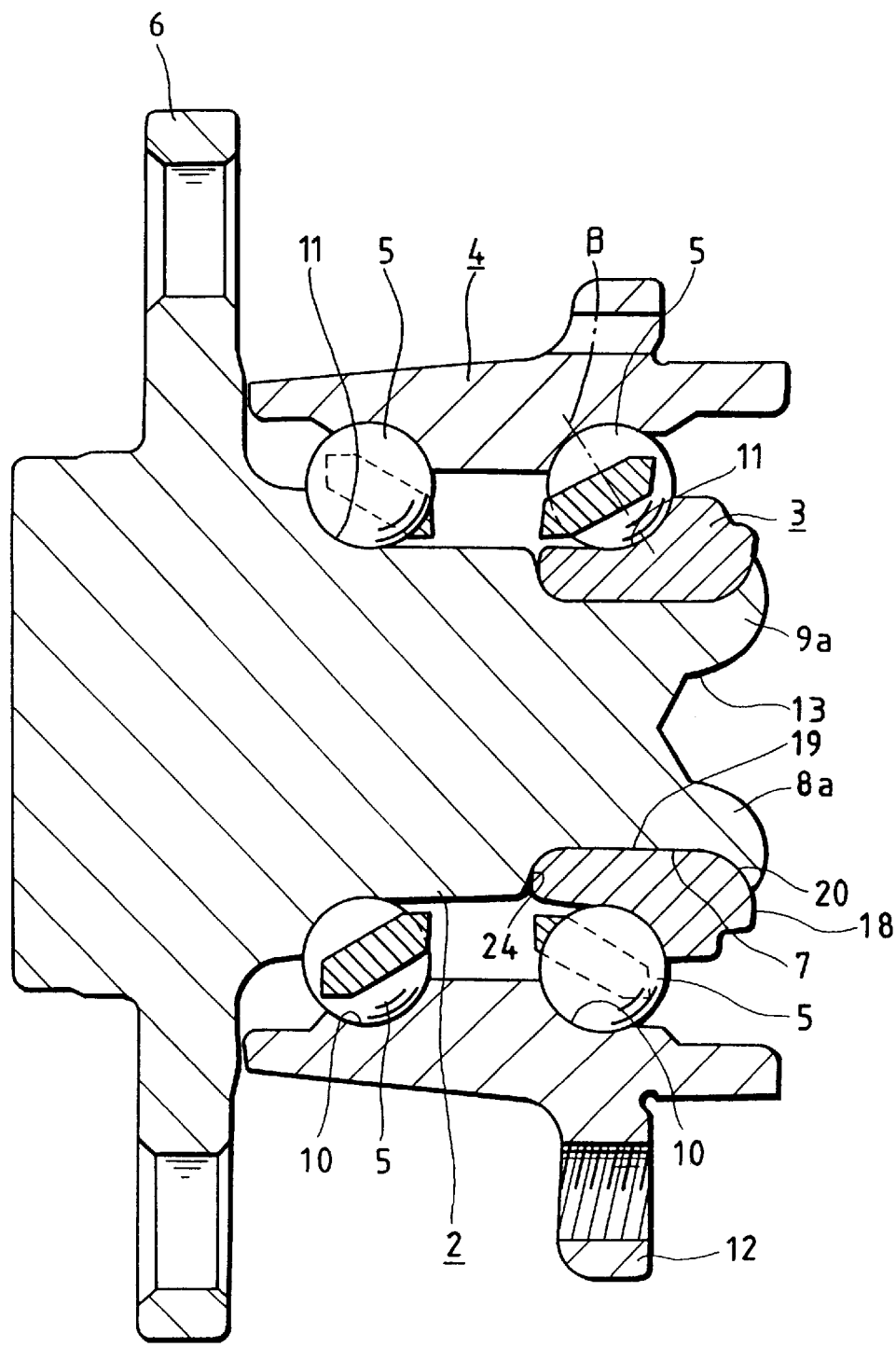
FIG. 1 is a cross-sectional view showing one embodiment of the present invention.

It is desirable to set the line of action of the load exerted on the inner ring 3 from the plurality of rolling elements 5, 5 (i.e., chain line β which is shown in FIG. 1 and indicates a contact angle of the rolling element 5) so as to pass through a mating surface between the inner peripheral surface of the inner ring 3 and the leading end of the shaft member 2 and so as not to pass through the caulked portion 9a.

The reason for this is that the caulked portion 9a is protected from damage by preventing the load from directly acting on the caulked portion 9a as deforming force in the diametrical inward direction.

Next, taking the cross-sectional area of the portion of the inner ring 3 closer toward the outside relative to the inner raceway 11 (i.e., the area indicated by line X—X shown in FIG. 2) as $S_3$ and the cross-sectional area of the shaft member 2 in the corresponding portion as $S_2$, the relationship between $S_2$ and $S_3$ is set to $S_3<S_2$, and more preferably to $S_3 \leq 0.94 S_2$. The reason why the cross-sectional area of each of these areas is limited, is for ensuring the holding strength of the inner ring 3 relative to the shaft member 2. In other words, force to axially press the inner ring 3 and to prevent rotation of the inner ring 3 (i.e., axial force) while the inner ring 3 is held between the caulked portion 9a and the vertical surface 24, is determined by the difference between the amount of axial deflection of the shaft member 2 and the amount of axial deflection of the inner ring 3. In short, during the course of a caulking operation, the amount of elastic deflection of the inner ring 3 is greater than that of the shaft member 2. After completion of the caulking operation, the inner ring 3 and the shaft member 2 elastically return to their original states, imparting axial force to the inner ring 3. Since the inner ring 3 is formed from substantially the same material as that of the shaft member 2, they have substantially the same elastic modulus. As mentioned previously, so long as the relationship between $S_2$ and $S_3$ is set to $S_3<S_2$, the amount of elastic deformation of the inner ring 3 is greater than that of the shaft member 2 during the caulking operation. Accordingly, so long as the cross-sectional areas of corresponding portions of the inner ring and the shaft member are limited in a manner as mentioned previously, sufficient compressive load is continually imparted to the inner ring 3, thereby effectively preventing a so-called creeping phenomenon in which the inner ring 3 rotates around the shaft member 2.

EXAMPLE

Figure 2:
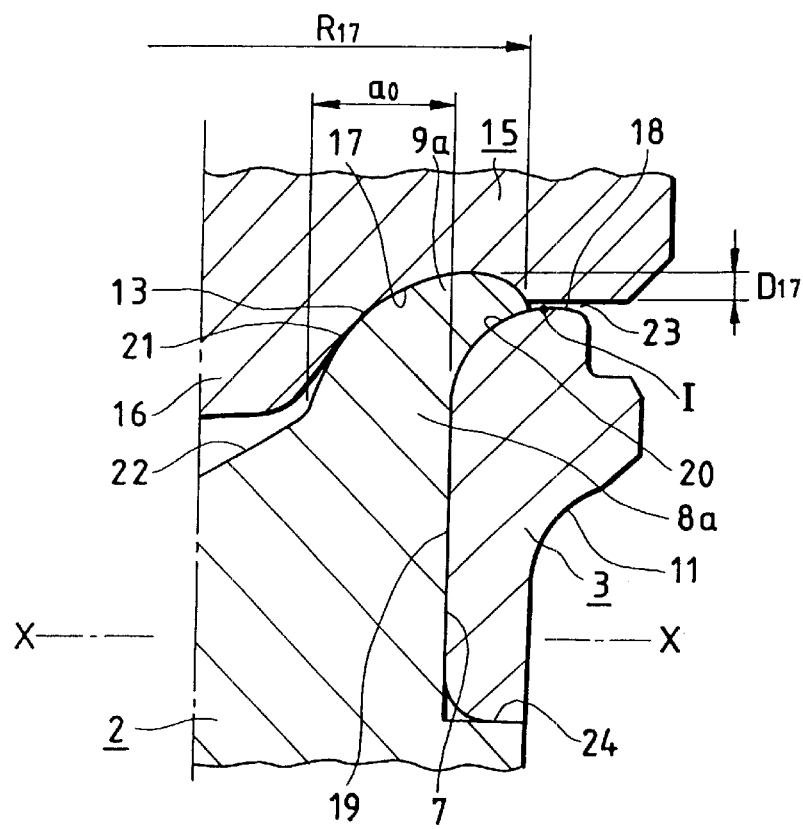
FIG. 2 is a fragmentary cross-sectional view showing the inner end of a shaft member which is caulked and extended to fix an inner ring at the time of manufacture of a hub unit.
Figure 3:
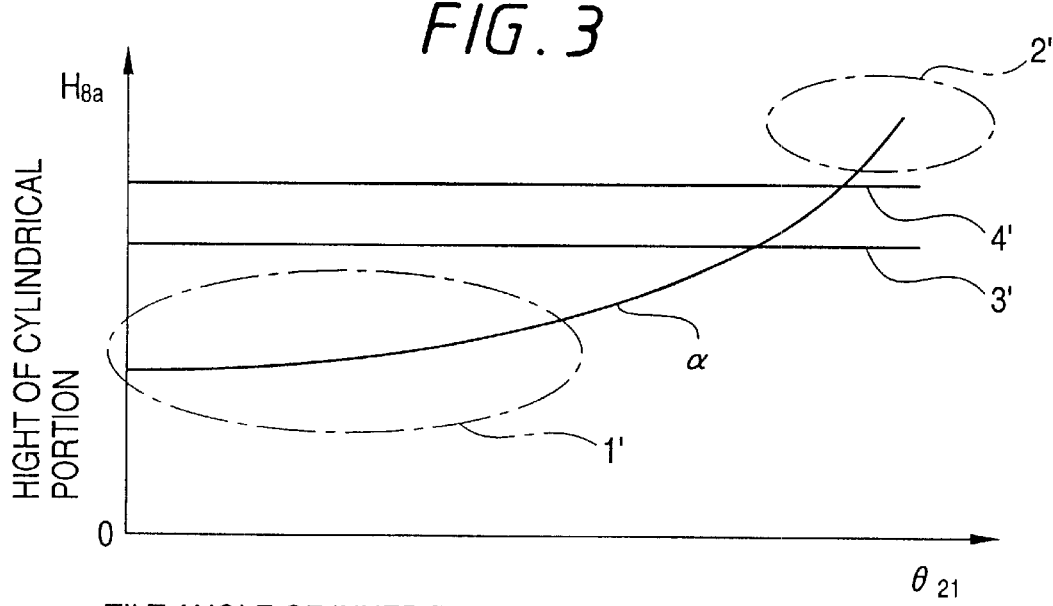
FIG. 3 is a plot showing the relationship between the height of a cylindrical portion and a tilt angle of the inner peripheral surface of the cylindrical portion relative to the center axis of the cylindrical portion, provided that the volume of the caulked portion is constant.

An explanation will be given of one example of dimensions of respective elements suitable for implementing the structure such as that shown in FIGS. 1 and 2. The shaft member 2 and the inner ring 3 are formed of structural carbon steel (S53C) including 0.4 to 0.6 wt % carbon, and the inner raceway 11 and other required portions are subjected to induction hardening treatment. First, the inner diameter $R_3$ of the inner ring 3 to be fitted around the shaft member 3 (see FIG. 5) is set to 26.0 mm. Further,.axial distance $L_0$ from the axial leading edge of the caulked portion 9a to the second axial position C set at a point of the innermost end of the inner peripheral surface 21 of the cylindrical portion 8a (see FIG. 6) used for forming the caulked portion 9a is set to 7.5 mm. Further, distance $L_{11}$, from the inner end surface 18 of the inner ring 3 to the third axial position B, which is set at an end of the inner raceway 11, which is formed along the outer periphery of the inner ring 3, at the side of the inner end surface 18, is set to 9.36 mm. Further, the inner diameter $r_{21}$ of the inner peripheral surface 21 at the second axial direction C is set to 11.4 mm. Axial distance $L_{BC}$ between the second and third axial positions B and C is set to 3.86 mm. In such a case, axial distance $L_{AC}$ (not shown) between the first axial position A and the second axial position C is set to 0.5 mm. Still further, the thickness a, of the caulked portion 9a at the first axial position A is set to 7.3 mm. Furthermore, the distance from the outer peripheral edge of the caulked portion 9a to the point of junction I between the inner end surface 18 and the chamfer 20 is set to 0.96 mm.

The caulked portion 9a mentioned previously is formed by elastic deformation of the cylindrical portion 8a formed at the inner end of the shaft member 2 by oscillating pressing operations such as those shown in FIG. 7. In the oscillating pressing operation, a oscillating press machine called a rocking press having a capacity of about 100 tons for example is used to machine the cylindrical portion for about five seconds through oscillating pressing while the angle of oscillation $\theta_{19}$ is set to about two degrees.

A hub unit for supporting a vehicle wheel according to the present invention has the foregoing structure and operates in a manner as mentioned previously, and hence a caulked portion is protected from damage such as cracks or burrs which cause an excessive thickness of the caulked portion. Further, the caulked portion prevents the diameter of an inner ring to be fitted around a shaft member from being changed to such an extent as to pose practical problems. Moreover, the risk of the inner ring or the caulked portion being damaged or subjected to imperfections by fitting of the inner ring around the shaft member is reduced, and the preload exerted on the inner ring can be maintained at an optimum value.

What is claimed is:

1. A method of assembling a hub unit, the method comprising:

providing a shaft member having a first inner raceway on an intermediate portion thereof and a stepped portion that has an outer diameter that is smaller than that of a portion of the shaft member on which the first inner raceway is provided;

fitting an inner ring, which has a second inner raceway and a small diameter portion formed at one end thereof, around the stepped portion;

providing an outer ring, which has a first outer raceway and a second outer raceway on an internal peripheral surface thereof, on the shaft member so that the first outer raceway faces the first inner raceway and the second outer raceway faces the second inner raceway;

interposing a plurality of rolling elements between the first inner raceway and the first outer raceway and between the second inner raceway and the second outer raceway; and caulking an extended portion of the shaft member, which extends in an axial direction beyond at least the inner ring, in a diametrical outward direction to form a caulked portion, such that the caulked portion presses the inner ring toward an end face of the stepped portion, wherein the caulking is performed while radially pressing a large diameter portion of the inner ring, which is located at an axial position of the inner ring, with a pressure piece.

* * * * *